(No Model.)
R. S. BAXTER & G. D. MACDOUGALD.
PROCESS OF DELINTING COTTON SEED.
No. 439,464. Patented Oct. 28, 1890.
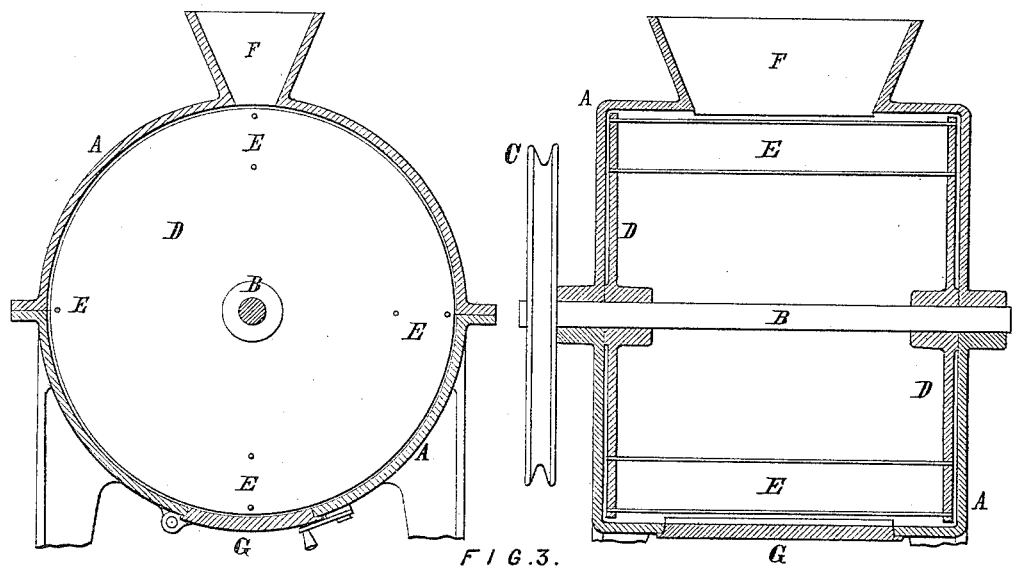
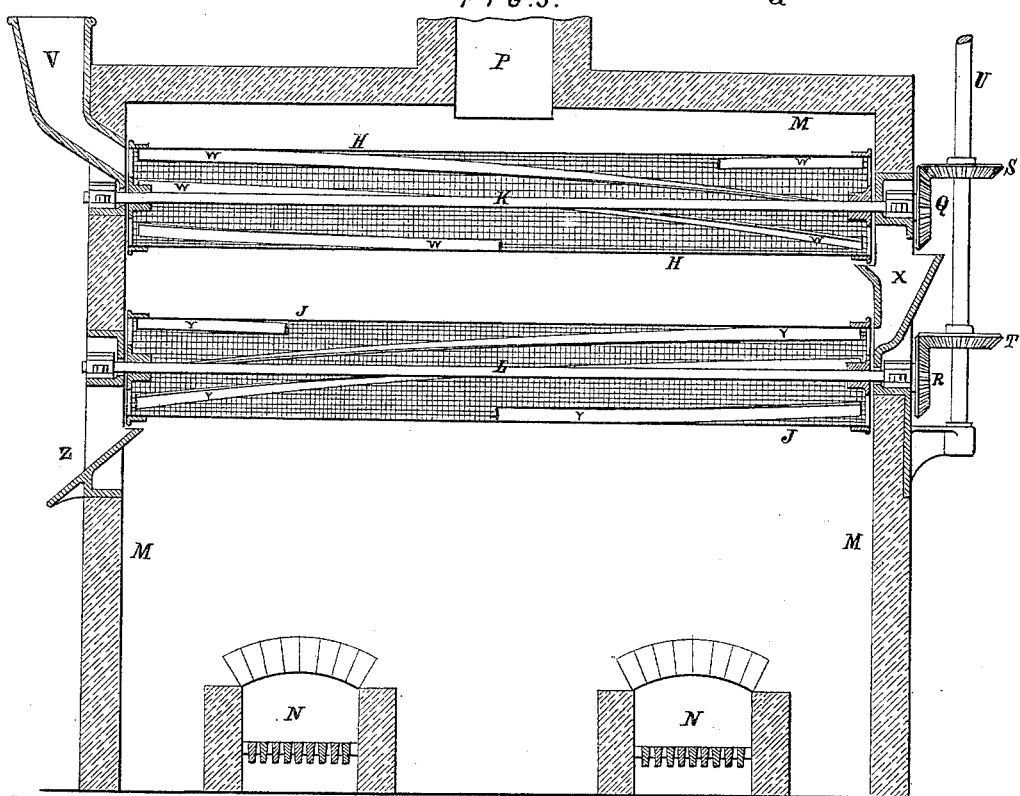
Witnesses
S. C. Connor
John Revell
Inventors
Robert Simpson Baxter & George Duncan Macdougald
By their Attorneys
Howson and Howson

UNITED STATES PATENT OFFICE.

ROBERT SIMPSON BAXTER AND GEORGE DUNCAN MACDOUGALD, OF DUNDEE, SCOTLAND.

PROCESS OF DELINTING COTTON-SEED.

SPECIFICATION forming part of Letters Patent No. 439,464, dated October 28, 1890.

Application filed December 27, 1888. Serial No. 294,764. (No model.) Patented in England June 5, 1888, No. 8,187; in Germany November 29, 1888, No. 49,043; in France December 1, 1888, No. 194,474; in Belgium December 1, 1888, No. 84,148; in Denmark December 24, 1888, No. 1,282; in Canada February 27, 1889, No. 30,859, and in India March 4, 1889, No. 156.

*To all whom it may concern:*

Be it known that we, ROBERT SIMPSON BAXTER and GEORGE DUNCAN MACDOUGALD, subjects of the Queen of Great Britain and Ireland, and residents of Dundee, in the county of Forfar, Scotland, have invented an Improved Process for Delinting Cotton-Seed, (for which there have been obtained Letters Patent in Germany, No. 49,043, November 29, 1888; in France, No. 194,474, December 1, 1888; in Belgium, No. 84,148, December 1, 1888; in Denmark, No. 1,282, December 24, 1888; in India, No. 156, March 4, 1889; in Canada, No. 30,859, February 27, 1889, and in Great Britain, No. 8,187, June 5, 1888,) of which the following is a specification.

Our said invention has for its object the removal of cotton lint or fiber from cotton-seed in an improved and economical manner.

In carrying out our invention we first moisten or impregnate the fiber on the cotton-seed with dilute sulphuric acid. We next apply a heating and drying process, and the diluteness of the acid is such as with the heat subsequently applied to alter the cotton fiber without carbonizing or destroying it, but in a manner to facilitate its subsequent removal and so that it may be applicable for some useful purpose. After the heating and drying process has been effected the cotton-seeds are subjected to a heating or whipping or other suitable mechanical operation, whereby the altered fiber is removed from the seeds with comparative facility.

In the first stage of the process it is important to insure the uniform or equable distribution of the dilute acid throughout the whole of the cotton-seeds operated on. As a means of effecting the desired uniform distribution or impregnation we, according to one modification, employ stirring apparatus into which the cotton-seed and dilute acid are put and in which a series of wires or thin rods are made to rotate, the driving or whipping of the wires or rods through the mass of moistened seeds operating with less power and more effectually than ordinary apparatus employed for similar purposes.

According to a second modification we pass the cotton-seeds between rollers covered with a soft absorbent material—such as cloth, asbestus, felt, or similar material—to which rollers the dilute acid is also applied. The rollers are adjusted, as regards pressure and contact, so as to supply each seed with the proper amount of dilute acid.

According to a third modification the cotton-seed is immersed in a bath of the dilute acid, and then separated from excess by draining with or without pressure or by means of centrifugal apparatus.

By insuring uniform distribution of the dilute acid, as hereinbefore indicated, we are enabled to operate with a small quantity, thereby not only effecting economy of the acid employed, but also preventing unequal action on the cotton fiber or excessive and defective actions on different portions.

In dealing with cotton-seeds well covered with fiber we mix from one to two pounds sulphuric acid of a strength of 110° Twaddle, (or an equivalent quantity of another strength,) with two gallons of water, thereby forming a solution for treating one hundred pounds of cotton-seeds.

We do not restrict ourselves to the quantities we have mentioned, as the quantities of acid and water to be used will vary with the quantity of fiber on the cotton-seeds, and the quantities may also be varied to some extent without detriment even with similar kinds of cotton-seeds.

On an accompanying sheet of explanatory drawings mixing or distributing and drying and heating apparatus of the kind we prefer to use is delineated, Figures 1 and 2 being vertical sections as at right angles to each other of the mixing-machine, and Fig. 3 being a vertical section of the drying and heating apparatus.

The mixing-machine, Figs. 1 and 2, comprises a horizontal cylindrical vessel A, of wood or metal or a combination, a shaft B, placed in or near the axis of the vessel A and passing through the ends, a pulley C on one end of the shaft for a driving-rope, two disks D D, fixed on the shaft B inside the vessel A, and a set of wires or thin rods E, extending from one disk D to the other.

A hopper F for introducing the cotton-seeds and dilute acid is provided at the top of the vessel A, and a discharge-door G is fitted to the bottom, or the dilute acid may be introduced by separate openings or pipes or in the form of spray. We fill the vessel A about one-third full, and we find one hundred and fifty to two hundred revolutions of the machine to be suitable; but the speed may, however, be varied.

The drying apparatus, Fig. 3, comprises two wire-gauze cylinders H J, carried on shafts K L in the upper part of a stove or closed chamber M, having grates N N for fires and an outlet-flue P, leading to a chimney. The cylinders H J are made to rotate by means of bevel-wheels Q R, gearing with bevel-wheels S T on a vertical shaft U, driven in any convenient way. The moistened cotton-seeds are by means of a hopper V led into one end of the upper cylinder H, and are made to travel along it by means of inclined blades W, fixed inside the cylinder. From the upper cylinder H a guide-duct X leads the seeds into one end of the lower cylinder J, along which they are made to travel by inclined blades Y, being delivered from the other end down a chute Z. The cylinders H J may be inclined in reverse directions instead of being fitted with inclined blades to cause the seeds to move along them. The inclined blades W and Y have a tipping action, which greatly facilitates and expedites the drying process, each blade as it moves round carrying up a quantity of seeds and when reaching a certain height allowing the seeds to drop down across the cylinder. The cylinders H J may be made of any length found advantageous or convenient in practice. A single cylinder of sufficient length may be used, or more than two.

A modification of our mixing-machine (shown in Figs. 1 and 2 of the drawings and hereinbefore described) may be used for the final stage of the process—that is, for removing the altered fiber from the seeds. For this purpose the machine must be made with a perforated or wire-gauze shell instead of the close shell, so that the altered fibers may find their way out of the machine when detached.

We are aware that for many years sulphuric acid has been known as an agent for removing fiber from cotton-seeds. Sometimes it has been used in a somewhat diluted form without the employment of heat, so as to obtain the fiber from the seed in an unaltered condition. In other cases very strong acid has been used without the subsequent application of heat. Where heat has been used in connection with the process, it has been applied during the mixture with the acid, which also has been used at a strength much above that at which we use it, and in that case the cotton has been carbonized. In our process we uniformly moisten the fiber on the seed with very dilute sulphuric acid of about the strength hereinbefore set forth, and subsequently heat and dry the fiber, altering without carbonizing or destroying it. This treatment converts or alters the fibers more or less into hydro-cellulose, at the same time rendering them very friable, so that they can be much more easily and completely removed by the subsequent mechanical operations.

The object of drying when the seeds have been moistened with the dilute acid is to concentrate the acid to give it strength to act on the fiber. When the dilute sulphuric acid is heated, the water evaporates, leaving the acid stronger, so that by moistening with very dilute acid we get an extremely small quantity of actual acid uniformly distributed on the fiber, and then by heat concentrate it sufficiently to make it active on the fiber, there being not sufficient beyond what is necessary for acting on the fiber to injure the seeds or render them in the least unfit for making cattle-food.

We claim as our invention—

The process of treating cotton lint or fiber on cotton-seeds to facilitate its removal from the seeds, consisting in first uniformly moistening or impregnating the fiber on the seeds with a small quantity of dilute sulphuric acid of about the strength hereinabove set forth, and subsequently heating and drying the fiber, altering without carbonizing or destroying it, to remove it from the seeds, all substantially as described.

In testimony whereof we have signed our names to this specification in the presence of two subscribing witnesses.

ROBERT SIMPSON BAXTER.
    GEORGE DUNCAN MACDOUGALD.

Witnesses:
 CHARLES BAXTER,
 RICHD. L. BAXTER.